(12) United States Patent
Persson et al.

(10) Patent No.: US 12,330,445 B2
(45) Date of Patent: Jun. 17, 2025

(54) METHOD TO PRODUCE A BUILDING PANEL AND A SEMI-FINISHED PRODUCT

(71) Applicant: Välinge Innovation AB, Viken (SE)

(72) Inventors: Hans Persson, Perstorp (SE); Marcus Bergelin, Lerberget (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 17/375,046

(22) Filed: Jul. 14, 2021

(65) Prior Publication Data

US 2022/0063326 A1 Mar. 3, 2022

Related U.S. Application Data

(63) Continuation of application No. 16/062,277, filed as application No. PCT/SE2016/051294 on Dec. 20, 2016, now Pat. No. 11,090,972.

(30) Foreign Application Priority Data

Dec. 21, 2015 (SE) .................................... 1551683-4

(51) Int. Cl.
*B44C 5/04* (2006.01)
*B32B 3/06* (2006.01)
(Continued)

(52) U.S. Cl.
CPC .............. *B44C 5/0492* (2013.01); *B32B 3/06* (2013.01); *B32B 3/14* (2013.01); *B32B 5/00* (2013.01); *B32B 5/022* (2013.01); *B32B 5/024* (2013.01); *B32B 7/12* (2013.01); *B32B 13/08* (2013.01); *B32B 13/14* (2013.01); *B32B 19/046* (2013.01); *B32B 19/06* (2013.01); *B32B 21/02* (2013.01); *B32B 21/06* (2013.01); *B32B 21/08* (2013.01);
(Continued)

(58) Field of Classification Search
None
See application file for complete search history.

(56) References Cited

U.S. PATENT DOCUMENTS 5,405,681 A 4/1995 Nakayama et al.
6,001,490 A 12/1999 Rienäcker
(Continued)

FOREIGN PATENT DOCUMENTS

DE 19715268 A1 10/1998
DE 101 56 956 A1 6/2003
(Continued)

OTHER PUBLICATIONS

International Search Report/Written Opinion issued in PCT/SE2016/051294, mailed May 2, 2017, ISA/SE, Patent—och registreringsverket, Stockholm, SE, 20 pages.
(Continued)

*Primary Examiner* — Shawn Mckinnon
(74) *Attorney, Agent, or Firm* — Boone IP Law

(57) ABSTRACT

A method to produce a building panel, including: providing a substrate, applying a thermosetting binder in dry form on the substrate for forming a sub-layer, applying a sheet on the sub-layer, and pressing the substrate, the sub-layer and the sheet together to form a building panel, thereby the thermosetting binder of the sub-layer impregnates the sheet from below. Also, a semi-finished product.

23 Claims, 2 Drawing Sheets

(51) Int. Cl.

| | | |
|---|---|---|
| *B32B 3/14* | (2006.01) | |
| *B32B 5/00* | (2006.01) | |
| *B32B 5/02* | (2006.01) | |
| *B32B 7/12* | (2006.01) | |
| *B32B 13/08* | (2006.01) | |
| *B32B 13/14* | (2006.01) | |
| *B32B 19/04* | (2006.01) | |
| *B32B 19/06* | (2006.01) | |
| *B32B 21/02* | (2006.01) | |
| *B32B 21/06* | (2006.01) | |
| *B32B 21/08* | (2006.01) | |
| *B32B 21/10* | (2006.01) | |
| *B32B 27/10* | (2006.01) | |
| *B32B 27/12* | (2006.01) | |
| *B32B 27/20* | (2006.01) | |
| *B32B 29/00* | (2006.01) | |
| *B32B 29/02* | (2006.01) | |
| *B32B 37/12* | (2006.01) | |
| *B32B 38/00* | (2006.01) | |
| *B32B 38/14* | (2006.01) | |
| *E04F 15/10* | (2006.01) | |
| *B44C 1/24* | (2006.01) | |
| *E04F 15/02* | (2006.01) | |

(52) U.S. Cl.
CPC .............. *B32B 21/10* (2013.01); *B32B 27/10* (2013.01); *B32B 27/12* (2013.01); *B32B 27/20* (2013.01); *B32B 29/002* (2013.01); *B32B 29/005* (2013.01); *B32B 29/02* (2013.01); *B32B 37/12* (2013.01); *B32B 38/14* (2013.01); *B32B 38/145* (2013.01); *B44C 5/04* (2013.01); *B44C 5/0476* (2013.01); *E04F 15/107* (2013.01); *B32B 29/00* (2013.01); *B32B 2250/02* (2013.01); *B32B 2250/03* (2013.01); *B32B 2255/00* (2013.01); *B32B 2255/08* (2013.01); *B32B 2255/10* (2013.01); *B32B 2255/12* (2013.01); *B32B 2255/26* (2013.01); *B32B 2260/021* (2013.01); *B32B 2260/028* (2013.01); *B32B 2260/046* (2013.01); *B32B 2262/062* (2013.01); *B32B 2307/4023* (2013.01); *B32B 2307/718* (2013.01); *B32B 2307/7246* (2013.01); *B32B 2307/73* (2013.01); *B32B 2307/75* (2013.01); *B32B 2419/00* (2013.01); *B32B 2419/04* (2013.01); *B32B 2471/00* (2013.01); *B32B 2479/00* (2013.01); *B32B 2607/00* (2013.01); *B44C 1/24* (2013.01); *E04F 15/02* (2013.01)

(56) References Cited

U.S. PATENT DOCUMENTS

| | | |
|---|---|---|
| 6,635,142 B1 | 10/2003 | Stula et al. |
| 6,666,951 B1 | 12/2003 | Kostiw |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,573,343 B2 | 2/2017 | Pervan |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan et al. |
| 2004/0123542 A1 | 7/2004 | Grafenauer |
| 2004/0191547 A1 | 9/2004 | Oldorff |
| 2004/0250911 A1 | 12/2004 | Vogel |
| 2005/0193677 A1 | 9/2005 | Vogel |
| 2005/0249929 A1 | 11/2005 | Reichwein et al. |
| 2006/0182938 A1 | 8/2006 | Oldorff |
| 2007/0224438 A1 | 9/2007 | Van Benthem et al. |
| 2009/0031662 A1 | 2/2009 | Chen |
| 2009/0145066 A1 | 6/2009 | Pervan |
| 2009/0155612 A1 | 6/2009 | Pervan et al. |
| 2009/0294037 A1 | 12/2009 | Oldorff |
| 2010/0092731 A1 | 4/2010 | Pervan et al. |
| 2010/0196678 A1 | 8/2010 | Vermeulen |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0323187 A1 | 12/2010 | Kalwa |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0283650 A1 | 11/2011 | Pervan et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Håkansson et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0017452 A1 | 1/2014 | Pervan |
| 2014/0044872 A1 | 2/2014 | Pervan |

(56) References Cited

U.S. PATENT DOCUMENTS

| | | |
|---|---|---|
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199513 A1* | 7/2014 | Pervan .................. B05D 3/12 347/110 |
| 2014/0199558 A1 | 7/2014 | Pervan et al. |
| 2014/0234531 A1 | 8/2014 | Ziegler et al. |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2015/0343739 A1 | 12/2015 | Pervan et al. |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0194123 A1 | 7/2018 | Kalwa |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |

FOREIGN PATENT DOCUMENTS

| | | |
|---|---|---|
| DE | 10 2010 045 266 A | 3/2012 |
| EP | 1 454 763 A2 | 9/2004 |
| EP | 1 242 702 B1 | 11/2004 |
| EP | 1 584 378 A1 | 10/2005 |
| EP | 1 749 676 A1 | 2/2007 |
| EP | 1 977 909 A2 | 10/2008 |
| EP | 2 105 320 A1 | 9/2009 |
| EP | 2102320 A1 | 9/2009 |
| EP | 2213476 A1 | 8/2010 |
| EP | 1 977 909 B1 | 11/2010 |
| EP | 2 264 259 A2 | 12/2010 |
| EP | 3118015 A1 | 1/2017 |
| JP | H05-162230 A | 6/1993 |
| NZ | 225556 A1 | 2/1992 |
| WO | 01/48333 A1 | 7/2001 |
| WO | 2007/015669 A2 | 2/2007 |
| WO | WO 2008/004960 A2 | 1/2008 |
| WO | 2008/076825 A1 | 6/2008 |
| WO | 2008/148771 A1 | 12/2008 |
| WO | WO 2009/065769 A2 | 5/2009 |
| WO | 2009/080772 A1 | 7/2009 |
| WO | 2009/080813 A1 | 7/2009 |
| WO | WO 2009/116926 A1 | 9/2009 |
| WO | WO 2009/124704 A1 | 10/2009 |
| WO | WO 2010/087752 A1 | 8/2010 |
| WO | 2011/087422 A1 | 7/2011 |
| WO | WO 2011/087423 A1 | 7/2011 |
| WO | WO 2013/032387 A1 | 3/2013 |
| WO | WO2013032387 * | 3/2013 |
| WO | WO 2014/027179 A1 | 2/2014 |
| WO | WO 2014/109697 A1 | 7/2014 |
| WO | WO2014109697 * | 7/2014 |
| WO | WO 2015/152802 A1 | 10/2015 |
| WO | WO 2015/174909 A1 | 11/2015 |
| WO | WO 2016/204681 A1 | 12/2016 |

OTHER PUBLICATIONS

Extended European Search Report issued in EP 16879485.7, Apr. 17, 2019, European Patent Office, Munich, DE, 6 pages.

BTLSR Toledo, Inc. website. http://www.btlresins.com/more.html. "Advantages to Using Powdered Resins," May 26, 2007, 2 pages, per the Internet Archive WayBackMachine.

Floor Daily, "Shaw Laminates: Green by Design," Aug. 13, 2007, 1 pg, Dalton, GA.

Le Fur, X., et al., "Recycling melamine-impregnated paper waste as board adhesives," published online Oct. 26, 2004, pp. 419-423, vol. 62, Springer-Verlag, DE, XP055332791.

Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.

Odian, George, "Principles of Polymerization," 1991, $3^{rd}$ Edition, 5 pages incl. pp. 122-123, John Wiley & Sons, Inc., New York, NY, USA.

Parquet International, "Digital Printing is still an expensive process," Mar. 2008, cover page/pp. 78-79, www.parkettmagazin.com.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Decision to grant a European patent received for European Application No. 16879485, mailed on Sep. 1, 2022, 2 pages.

European Search Report and Search Opinion received for EP Application No. 22195664, mailed on Dec. 8, 2022, 8 pages.

Intention to grant received for European Application No. 16879485, mailed on Apr. 14, 2022, 6 pages.

International Preliminary Report on Patentability received for PCT Patent Application No. PCT/SE16/051294, mailed on Jul. 5, 2018, 14 pages.

Invitation to Pay Additional Fees received for PCT Patent Application No. PCT/SE2016/051294, mailed on Mar. 27, 2017, 4 pages.

Office Action received for European Application No. 16879485, mailed on Dec. 2, 2019, 4 pages.

Office Action received for European Application No. 16879485, mailed on Dec. 4, 2020, 3 pages.

* cited by examiner

METHOD TO PRODUCE A BUILDING PANEL AND A SEMI-FINISHED PRODUCT

CROSS REFERENCE TO RELATED APPLICATIONS

The present application is a continuation of U.S. application Ser. No. 16/062,277, filed on Jun. 14, 2018, which is a U.S. national stage of International Application No. PCT/SE2016/051294, filed on Dec. 20, 2016, which claims the benefit of Swedish Application No. 1551683-4, filed on Dec. 21, 2015. The entire contents of each of U.S. application Ser. No. 16/062,277, International Application No. PCT/SE2016/051294, and Swedish Application No. 1551683-4 are hereby incorporated herein by reference in their entirety.

TECHNICAL FIELD

The present invention relates to methods to produce a building panel and a semi-finished product.

TECHNICAL BACKGROUND

Recently, digital printing has offered new possibilities to the flooring industry to customize decorative patterns for flooring applications and to print small quantities of décor layers. By digital printing is conventionally meant printing by means of non-contact printing, for example using a Drop-on-Demand (DOD) technique. A drop of ink is placed with great accuracy on a paper or wood surface. Examples of DOD techniques are piezoelectric DOD inkjet and thermal DOD inkjet. In a piezoelectric DOD inkjet printer, the piezoelectric material changes shape when a voltage is applied. The change of shape of the piezoelectric material generates a pressure pulse in the fluid, thereby ejecting a droplet of ink from the nozzle. In a thermal DOD inkjet printer, ink drops are ejected by forming an ink vapour bubble by heating the ink.

Different kind of inks may be used for digital printing, such as UV curable inks, solvent based inks and aqueous inks (also called waterborne or water based inks).

For laminate floorings, comprising at least one resin impregnated paper sheet, digital printing on resin impregnated paper sheets has involved some difficulties and resulted in poor printing quality. Resin impregnated paper sheets have shown poor ink receptive properties, which may result in bleeding during printing. During pressing, a décor printed on an impregnated paper bleeds even further due to flowing of the resin during pressing. One solution to this problem is disclosed in EP 1 749 676, wherein the paper sheet is impregnated with liquid resin that does not completely penetrate the paper sheet, so that the other side of the paper sheet remains at least substantially free of resin. The paper sheet is printed by digital printing on the side of the paper sheet remaining at least substantially free of resin. However, it may be difficult to secure that a uniform unimpregnated layer for receiving the print is obtained by the method. Further, the print side of the paper remains unimpregnated.

WO2013/032387 discloses a method to impregnate a paper sheet from below by means of a powder based sub-layer comprising wood fibres and a thermosetting resin. US2010/0239820 discloses applying a layer of liquid glue on a plate made of fibre or particle material, and pressing a decorative layer not impregnated with resin onto the layer of glue. US2010/0307677 discloses fastening a paper to a core, printing a decoration on the paper, and attaching a curable cover layer on the printed decoration, and curing the curable layers.

SUMMARY

It is an object of at least embodiments of the present invention to provide an improvement over the above described techniques and known art.

A further object of at least embodiments of the present invention is to improve the printing quality when digital printing on sheets for laminate floorings compared to printing on impregnated sheets.

A further object of at least embodiments of the present invention is to facilitate printing on sheet such as a paper sheet.

A further object of at least embodiments of the present invention is to facilitate digital printing on a sheet when attached to a substrate, for example for coordinating the print with an embossed structure.

At least some of these and other objects and advantages that will be apparent from the description have been achieved by a method to produce a building panel according to a first aspect of the invention. The method comprises—
providing a substrate,
applying a thermosetting binder in dry form on the substrate for forming a sub-layer,
applying a sheet on the sub-layer, and
pressing the substrate, the sub-layer and the sheet together to form a building panel, thereby the thermosetting binder of the sub-layer impregnates the sheet from below.

The thermosetting binder may be in dry powder form.

The sheet may be or comprise one or more of a paper sheet, a non-woven, a woven fibre sheet, or a fibre sheet.

The sub-layer may substantially consist of the thermosetting binder. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbing the thermosetting binder. Preferably, the fillers may absorb at least less moisture, and thereby thermosetting binder, than wood fibres. The sub-layer may comprise inert fillers such as non-absorbing fillers.

According to one aspect of the invention, the sub-layer comprises the thermosetting binder and non-absorbing fillers. The non-absorbing fillers may be glass fibres, barium sulphate, calcium carbonate, talc, etc. The non-absorbing fillers have a function of reinforcing the layer and/or cover the colour of the substrate. The non-absorbing filler may be a non-porous filler. The filler may be an inorganic filler.

An advantage of at least embodiment of the present invention is that a conventional paper for laminate flooring may be used. No specialized print paper for inkjet printing is required in order to obtain the desired print quality. As a consequence, the cost is reduced compared to using a specialized inkjet print paper. Further, it is not required that the sheet has a comparable strength as required when the sheet is adapted to be impregnated in a conventional impregnation process.

A further advantage of printing on a sheet already adhered to the substrate by means of the sub-layer is that no positioning and difficult matching of the printed sheet to the substrate has to take place. Due to the adherence to the sub-layer, the sheet moves less during printing. The sheet will swell less during printing, and less consideration to swelling of the sheet during printing has to be taken. Coordinating the print with an embossed structure of a press plate is therefore facilitated in order to obtain a décor with an embossed structure in register with the décor.

By impregnating the sheet from below during pressing, a sheet such as a paper adapted to reduce flowing of ink into the paper can be used. Such a paper is difficult to impregnated from above during pressing, since the properties of the paper reducing flowing of ink into paper also reduce flowing of thermosetting binder into the paper during pressing, such that an inferior impregnation of the paper is obtained.

An advantage of not including absorbing fillers, such as wood fibres, in the sub-layer is that less thermosetting binder is required to impregnate the sheet. There are no absorbing fillers in the sub-layer that the thermosetting binder has to impregnate in addition to the sheet, which is intended to be impregnated. Further, when including absorbing fillers in the sub-layer, a pre-pressing step may be required in order to adhere the sheet to the sub-layer.

Compared to using a liquid binder, more thermosetting binder may be applied without risking fibre swelling of the substrate. Furthermore, using a liquid binder also requires long drying zones.

The sheet may be unimpregnated, or at least substantially unimpregnated, when applied on the sub-layer. An advantage is that the sheet, or at least an upper surface of the sheet facing away from the sub-layer, remains unimpregnated and substantially resin-free when arranged on the substrate. Thereby, it is possible to print on an unimpregnated surface of the sheet, while the sheet is arranged on the substrate. By printing on an unimpregnated surface of the sheet, for example, by means of digital printing, such as inkjet printing, the print is improved and an improved printing result is obtained. For example, bleeding is reduced. By bleeding is meant that ink drops do not stay on the intended position but bleeds into adjacent print dots before drying and being absorbed into the sheet. Bleeding reduces the print quality.

By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced.

The sheet may be adhered to the substrate by means of the sub-layer.

The method may further comprise printing, preferably by digital printing, a décor on the sheet when arranged on the sub-layer. Preferably, the sheet is adhered to the sub-layer when printing. The printing may be performed by a digital printing technique. The digital printing technique may be any non-contact printing method, such as using a Drop-on-Demand (DOD) technique. Examples of DOD techniques are piezoelectric DOD inkjet and thermal DOD inkjet. The ink used may be curable inks such as UV curable inks, solvent based inks, and aqueous inks (also called waterborne or water based inks). The sheet may alternatively be printed by a contact print technique.

The sheet may be adhered to the sub-layer prior to printing.

Alternatively, the décor may already be printed on the sheet when arranged on the sub-layer. The décor may be printed on the sheet by conventional printing techniques, such as rotogravure.

The substrate may be a wood-based board. The substrate may be a wood-fibre based board, a Wood Plastic Composite (WPC), a thermoplastic board, a mineral board, a plasterboard, a phenolic paper, or a HPL.

The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The thermosetting binder may be an amino resin.

The thermosetting binder may comprise melamine formaldehyde resin, urea formaldehyde resin, phenol formaldehyde resin, or a combination thereof.

The method may further comprise applying moisture to the thermosetting binder, the sub-layer, the sheet, and/or the substrate prior to pressing. By applying moisture, the thermosetting binder of the sub-layer becomes sticky and thereby adheres the sheet to the sub-layer. Moisture may be applied by applying a liquid and/or applying steam.

The method may further comprise controlling moisture content of the sub-layer. By controlling moisture content of the sub-layer, adhesion of the sheet to the sub-layer can be controlled. Further, flowing of the thermosetting binder of the sub-layer can be controlled such that the thermosetting binder does not impregnate the sheet prior to pressing, or at least does not completely impregnate the sheet prior to pressing. By maintaining a low moisture content of the sub-layer, such that less than 30 wt %, flowing of the thermosetting binder can be reduced such that the amount of the thermosetting binder flowing to the upper surface of the sheet can be reduced. By keeping the amount of thermosetting binder in the upper surface of the sheet low, printing quality is improved compared to printing on sheet having a higher content of thermosetting binder, and drying can be excluded or reduced. Furthermore, by having a low moisture content in the sub-layer, fibre swelling can be avoided or at least reduced.

The moisture content of the sub-layer may be controlled by applying moisture and/or drying the thermosetting binder, the sub-layer, the sheet and/or the substrate.

By applying moisture to the sheet, flowing of the thermosetting binder of the sub-layer may be restricted, due to the higher moisture content of the sheet compared to the moisture content of the sub-layer.

A moisture content of the sub-layer may be 5-35 wt %, preferably 15-25 wt %, when arranged on the substrate prior to pressing. Thereby the sub-layer adheres the sheet to the substrate. Having a moisture content in the range of 5-35 wt %, preferably 15-25 wt %, avoids or at least reduces fibre swelling and flowing of the thermosetting binder to the upper surface of the sheet. In the embodiment wherein moisture is applied to the sub-layer by means of the sheet, the moisture content of the sub-layer is to be measured when the sheet is arranged on the sub-layer.

The sheet may be adhered to the sub-layer prior to pressing. By the sub-layer having a certain moisture content, for example 5-35 wt %, preferably 15-25 wt %, the thermosetting binder gets sticky and adheres the sheet to the sub-layer and thereby to the substrate.

The method may further comprise controlling reactivity and/or flowing of the sub-layer. The reactivity and/or flowing of the thermosetting binder of the sub-layer can be controlled, for example, by the moisture content of the sub-layer, the type of thermosetting binder and/or additives added to the thermosetting binder.

In one embodiment, the sub-layer is in dry form when the sheet is applied. It is also contemplated that a layer of a thermosetting binder in liquid form may be applied on the surface of the substrate prior to applying the sub-layer. In this embodiment, the thermosetting binder in dry form is applied on the thermosetting binder in liquid form. According to a second aspect of the invention, a method to produce a building panel is provided. The method comprises providing a substrate, controlling relative humidity (RH) of ambient air enclosing an application device adapted to apply a thermosetting binder in dry form, applying a thermosetting binder in dry form on the substrate by said application device for forming a sub-layer, applying a sheet on the sub-layer, and pressing the substrate, the sub-layer, and the sheet together to form a building panel, thereby the thermosetting binder of the sub-layer impregnates the sheet from below.

The thermosetting binder may be in dry powder form.

The sheet may be or comprise one or more of a paper sheet, a non-woven, a woven fibre sheet, or a fibre sheet.

An advantage of at least embodiments of the invention is that by controlling the relative humidity (RH) of the ambient air enclosing the application device, it is possible to handle and apply, for example, by scattering, a thermosetting binder in dry form, without problems with, or at least with reduced problems associated with the thermosetting binder getting sticky and adhering to the application device. By the relative humidity being in the range of, for example, 35-60% RH, preferably 40-55% RH, it is possible to apply a thermosetting binder in dry form without the thermosetting binder getting sticky.

It is an advantage that the relative humidity is less than 60% RH in order to get a uniform distribution of the sub-layer and facilitate uniform application of the sub-layer. Further, in order to avoid forming of static electricity, it is an advantage that the relative humidity is more than 35% RH.

As described above, an advantage of at least embodiment of the present invention is that a conventional paper for laminate flooring may be used. No specialized print paper for inkjet printing is required in order to obtain the desired print quality. As a consequence, the cost is reduced compared to using a specialized inkjet print paper.

A further advantage of printing on a sheet already adhered to the substrate by means of the sub-layer is that no positioning and difficult matching of the printed sheet to the substrate has to take place. Due to the adherence to the sub-layer, the sheet moves less during printing. The sheet will swell less during printing, and less consideration to swelling of the sheet during printing has to be taken. Coordinating the print with an embossed structure of a press plate is therefore facilitated in order to obtain a décor with an embossed structure in register with the décor.

By impregnating the sheet from below during pressing, a sheet such as a paper adapted to reduce flowing of ink into the paper can be used. Such a paper is difficult to impregnated from above during pressing, since the properties of the paper reducing flowing of ink into paper also reduce flowing of thermosetting binder into the paper during pressing, such that an inferior impregnation of the paper is obtained.

Compared to using a liquid binder, more thermosetting binder may be applied without risking fibre swelling of the substrate. Furthermore, using a liquid binder also requires long drying zones.

The relative humidity (RH) may be 35-60% RH, preferably 40-55% RH.

The sheet may be adhered to the substrate by means of the sub-layer.

The sheet may be unimpregnated, or at least substantially unimpregnated, when applied on the sub-layer. An advantage is that the sheet, or at least an upper surface of the sheet facing away from the sub-layer, remains unimpregnated and substantially resin-free when arranged on the substrate. Thereby, it is possible to print on an unimpregnated surface of the sheet, while the sheet is arranged on the substrate. By printing on an unimpregnated surface of the sheet, for example, by means of digital printing, such as inkjet printing, the print is improved and an improved printing result is obtained. For example, bleeding is reduced. By bleeding is meant that ink drops do not stay on the intended position but bleeds into adjacent print dots before drying and being absorbed into the sheet. Bleeding reduces the print quality.

By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced.

The sub-layer may substantially consist of the thermosetting binder. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbs the thermosetting binder. Preferably, the fillers may absorb at least less moisture, and thereby thermosetting binder, than wood fibres. The sub-layer may comprise inert fillers such as non-absorbing fillers. An advantage of not including absorbing fillers, such as wood fibres, in the sub-layer is that less thermosetting binder is required to impregnate the sheet. There are no absorbing fillers in the sub-layer that the thermosetting binder has to impregnate in addition to the sheet, which is intended to be impregnated. Further, when including absorbing fillers in the sub-layer, a pre-pressing step may be required in order to adhere the sheet to the sub-layer.

The sub-layer may comprise the thermosetting binder and non-absorbing filler such as glass fibres, barium sulphate, calcium carbonate, talc, etc. The non-absorbing fillers have a function of reinforcing the layer and/or cover the colour of the substrate. By non-absorbing filler may be a non-porous filler. The filler may be an inorganic filler.

The method may further comprise printing, preferably by digital printing, a décor on the sheet when arranged on the sub-layer. The printing may be performed by a digital printing technique. The digital printing technique may be any non-contact printing method, such as using a Drop-on-Demand (DOD) technique. Examples of DOD techniques are piezoelectric DOD inkjet and thermal DOD inkjet. The ink used may be curable inks such as UV curable inks, solvent based inks, and aqueous inks (also called waterborne or water based inks). The sheet may alternatively be printed by a contact print technique.

The sheet may be adhered to the sub-layer prior to printing.

Alternatively, the décor may already be printed on the sheet when arranged on the sub-layer. The décor may be printed on the sheet by conventional printing techniques, such as rotogravure.

The substrate may be a wood-based board. The substrate may be a wood-fibre based board, a Wood Plastic Composite (WPC), a thermoplastic board, a mineral board, a plasterboard, a phenolic paper, or a HPL.

The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The thermosetting binder may be an amino resin.

The thermosetting binder may comprise melamine formaldehyde resin, urea formaldehyde resin, phenol formaldehyde resin, or a combination thereof.

The method may further comprise comprising applying moisture to the thermosetting binder, the sub-layer, the sheet, and/or the substrate prior to pressing. By applying moisture, the thermosetting binder of the sub-layer becomes sticky and thereby adheres the sheet to the sub-layer. Moisture may be applied by applying a liquid and/or applying steam.

The method may further comprise controlling moisture content of the sub-layer. By controlling moisture content of the sub-layer, adhesion of the sheet to the sub-layer can be controlled. Further, flowing of the thermosetting binder of the sub-layer can be controlled such that the thermosetting binder does not impregnate the sheet prior to pressing, or at least does not completely impregnate the sheet prior to pressing. By maintaining a low moisture content of the sub-layer, such that less than 30 wt %, flowing of the thermosetting binder can be reduced such that the amount of the thermosetting binder flowing to the upper surface of the sheet can be reduced. By keeping the amount of thermosetting binder in the upper surface of the sheet low, printing quality is improved compared to printing on sheet having a higher content of thermosetting binder, and drying can be excluded or reduced. Furthermore, by having a low moisture content in the sub-layer, fibre swelling can be avoided or at least reduced.

The moisture content of the sub-layer may be controlled by applying moisture and/or drying the thermosetting binder, the sub-layer, the sheet, and/or the substrate prior to pressing.

A moisture content of the sub-layer may be 5-35 wt %, preferably 15-25 wt %, when arranged on the substrate prior to printing. Thereby the sub-layer adheres the sheet to the sub-layer. Having a moisture content in the range of 5-35 wt %, preferably 15-25 wt %, avoids or at least reduces fibre swelling and flowing of the thermosetting binder to the upper surface of the sheet. In the embodiment wherein moisture is applied to the sub-layer by means of the sheet, the moisture content of the sub-layer is to be measured when the sheet is arranged on the sub-layer.

The sheet may be adhered to the sub-layer prior to pressing. By the sub-layer having a certain moisture content, for example 5-35 wt %, preferably 15-25 wt %, the thermosetting binder gets sticky and adheres the sheet to the sub-layer.

The method may further comprise controlling reactivity and/flowing of the sub-layer. The reactivity and/or flowing of the thermosetting binder of the sub-layer can be controlled, for example, by the moisture content of the sub-layer, the type of thermosetting binder and/or additives added to the sub-layer.

In one embodiment, the sub-layer is in dry form when the sheet is applied.

It is also contemplated that a layer of a thermosetting binder in liquid form is applied on the surface of the substrate prior to applying the sub-layer. In this embodiment, the thermosetting binder in dry form is applied on the thermosetting binder in liquid form.

According to a third aspect of the invention, a method to produce a building panel is provided. The method comprises:
providing a substrate,
applying a thermosetting binder in dry form on the substrate for forming a sub-layer,
controlling the moisture content of the sub-layer when arranged on the substrate,
applying a sheet on the sub-layer, and
pressing the substrate, the sub-layer and the sheet together to form a building panel, thereby the thermosetting binder of the sub-layer impregnates the sheet from below.

The thermosetting binder may be in dry powder form.

An advantage of controlling the moisture content of the sub-layer when arranged on the substrate is that it is possible to control flowing of the thermosetting binder of the sub-layer. By keeping a low moisture content of the sub-layer, such as in the range of 5-35 wt %, preferably 15-25 wt %, it is possible to prevent, or at least reduce, flowing of the thermosetting binder into and through the sheet arranged on the sub-layer. A low moisture content results in a thermosetting binder with low flowability. By reducing the amount of thermosetting binder on the upper surface of the sheet, which is intended to be printed, an improved print quality may be achieved.

By controlling moisture content of the sub-layer, adhesion of the sheet to the sub-layer can be controlled. Further, flowing of the thermosetting binder of the sub-layer can be controlled such that the thermosetting binder does not impregnate the sheet prior to pressing, or at least does not completely impregnate the sheet prior to pressing. By maintaining a low moisture content of the sub-layer, such that less than 30 wt %, flowing of the thermosetting binder can be reduced such that the amount of the thermosetting binder flowing to the upper surface of the sheet can be reduced. By keeping the amount of thermosetting binder in the upper surface of the sheet low, printing quality is improved compared to printing on sheet having a higher content of thermosetting binder, and drying can be excluded or reduced. Furthermore, by having a low moisture content in the sub-layer, fibre swelling can be avoided or at least reduced.

By applying moisture to the sheet, flowing of the thermosetting binder of the sub-layer may be restricted, due to the higher moisture content of the sheet compared to the moisture content of the sub-layer.

By impregnating the sheet from below during pressing, a sheet such as a paper adapted to reduce flowing of ink into the paper can be used. Such a paper is difficult to impregnated from above during pressing, since the properties of the paper reducing flowing of ink into paper also reduce flowing of thermosetting binder into the paper during pressing, such that an inferior impregnation of the paper is obtained.

Controlling the moisture content may comprise comprising applying moisture to and/or drying the thermosetting binder, the sub-layer, the sheet, and/or the substrate prior to pressing.

The step of controlling the moisture content of the sub-layer may comprise one or more of the following:
applying steam on the substrate prior to applying the sub-layer,
applying steam on the sub-layer when arranged on the substrate,
applying steam on the thermosetting binder during application of the thermosetting binder,
applying steam on the sheet prior to being applied on the sub-layer or when being arranged on the sub-layer,
applying liquid on the substrate prior to applying the sub-layer,
applying liquid on the sub-layer when arranged on the substrate,
applying liquid on the thermosetting binder during application of the thermosetting binder, applying liquid on the sheet prior to being applied on the sub-layer or when being arranged on the sub-layer, and/or drying the sub-layer when arranged on the substrate.

Controlling the moisture content may also comprise applying moist fillers on the sub-layer and/or on the substrate.

The moisture content of the sub-layer may be 5-35 wt %, preferably 15-25 wt %, when arranged on the substrate prior to pressing. Thereby the sub-layer adheres the sheet to the sub-layer and thereby to the substrate. Having a moisture content in the range of 5-35 wt %, preferably 15-25 wt %, avoids or at least reduces fibre swelling and flowing of the thermosetting binder to the upper surface of the sheet. In the embodiment wherein moisture is applied to the sub-layer by means of the sheet, the moisture content of the sub-layer is to be measured when the sheet is arranged on the sub-layer.

The sheet may be adhered to the sub-layer prior to pressing. By the sub-layer having a certain moisture content, for example 5-35 wt %, preferably 15-25 wt %, the thermosetting binder gets sticky and adheres the sheet to the sub-layer.

By applying moisture to the sheet, flowing of the thermosetting binder of the sub-layer may be restricted, due to the higher moisture content of the sheet compared to the moisture content of the sub-layer.

The sheet may be adhered to the substrate by means of the sub-layer.

The sheet may be unimpregnated, or at least substantially unimpregnated, when applied on the sub-layer. An advantage is that the sheet, or at least an upper surface of the sheet facing away from the sub-layer, remains unimpregnated and substantially resin-free when arranged on the substrate. Thereby, it is possible to print on an unimpregnated surface of the sheet, while the sheet is arranged on the substrate. By printing on an unimpregnated surface of the sheet, for example, by means of digital printing, such as inkjet printing, the print is improved and an improved printing result is obtained. For example, bleeding is reduced. By bleeding is meant that ink drops do not stay on the intended position but bleeds into adjacent print dots before drying and being absorbed into the sheet. Bleeding reduces the print quality.

By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced.

The sub-layer may substantially consist of the thermosetting binder. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbs the thermosetting binder. Preferably, the fillers may absorb at least less moisture, and thereby thermosetting binder, than wood fibres. The sub-layer may comprise inert fillers such as non-absorbing fillers. An advantage of not including absorbing fillers, such as wood fibres, in the sub-layer is that less thermosetting binder is required to impregnate the sheet. There are no absorbing fillers in the sub-layer that the thermosetting binder has to impregnate in addition to the sheet, which is intended to be impregnated. Further, when including absorbing fillers in the sub-layer, a pre-pressing step may be required in order to adhere the sheet to the sub-layer.

The sub-layer may comprise the thermosetting binder and non-absorbing filler such as glass fibres, barium sulphate, calcium carbonate, talc, etc. The non-absorbing fillers have a function of reinforcing the layer and/or cover the colour of the substrate. The non-absorbing filler may be a non-porous filler. The filler may be an inorganic filler.

Compared to using a liquid binder, more thermosetting binder may be applied without risking fibre swelling of the substrate. Furthermore, using a liquid binder also requires long drying zones.

The method may further comprise printing, preferably by digital printing, a décor on the sheet when arranged on the sub-layer. The printing may be performed by a digital printing technique. The digital printing technique may be any non-contact printing method, such as using a Drop-on-Demand (DOD) technique. Examples of DOD techniques are piezoelectric DOD inkjet and thermal DOD inkjet. The ink used may be curable inks such as UV curable inks, solvent based inks, and aqueous inks (also called waterborne or water based inks). The sheet may alternatively be printed by a contact print technique.

The sheet may be adhered to the sub-layer prior to printing. Alternatively, the décor may already be printed on the sheet when arranged on the sub-layer. The décor may be printed on the sheet by conventional printing techniques, such as rotogravure.

The substrate may be a wood-based board. The substrate may be a wood-fibre based board, a Wood Plastic Composite (WPC), a thermoplastic board, a mineral board, a plasterboard, a phenolic paper, or a HPL.

The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The thermosetting binder may be an amino resin.

The thermosetting binder may comprise melamine formaldehyde resin, urea formaldehyde resin, phenol formaldehyde resin, or a combination thereof.

The method may further comprise controlling reactivity and/or flowing of the sub-layer. The reactivity and/or flowing of the thermosetting binder of the sub-layer can be controlled, for example, by the moisture content of the sub-layer, the type of thermosetting binder and/or additives added to the sub-layer.

In one embodiment, the sub-layer is in dry form when the sheet is applied.

It is also contemplated that a layer of a thermosetting binder in liquid form is applied on the surface of the substrate prior to applying the sub-layer. In this embodiment, the thermosetting binder in dry form is applied on the thermosetting binder in liquid form.

According to a fourth aspect of the invention, a method to produce a building panel is provided. The method comprises:

providing a substrate, applying at least one thermosetting binder on the substrate, controlling reactivity of said at least one thermosetting binder by applying different types and/or forms of thermosetting binders on the substrate, applying a sheet on said at least one thermosetting binder, and pressing the substrate, said at least one thermosetting binder and the sheet together to form a building panel, thereby the thermosetting binder impregnates the sheet from below.

The sheet may be or comprise one or more of a paper sheet, a non-woven, a woven fibre sheet, or a fibre sheet.

By different types of thermosetting binders are meant different thermosetting binders, such as melamine formaldehyde resin and urea melamine formaldehyde resin.

By different forms of thermosetting binders are meant, for example, different forms such as in dry form and in liquid form.

Flow of said at least one thermosetting binder may be controlled by controlling reactivity of said at least one thermosetting binder.

An advantage of controlling the flow of the thermosetting binder is that it is possible to control the distribution of the thermosetting binder. A thermosetting binder with high reactivity may be applied on the substrate. During pressing, the thermosetting binder with high reactivity prevents flowing of any other thermosetting binder with lower reactivity into the substrate since the thermosetting binder with high reactivity cures faster than the other thermosetting binder with lower reactivity applied thereon. Thereby, the other thermosetting binder with lower reactivity will instead flow into the sheet and impregnate the sheet. Examples of thermosetting binders with higher reactivity may be thermosetting binders in liquid form, and/or certain types of thermosetting binders such as urea formaldehyde resin, compared to thermosetting binders with lower reactivity, such as thermosetting binders in dry form, and/or certain types of thermosetting binders such as melamine formaldehyde resin.

As an alternative, a thermosetting binder with low reactivity may be applied on the substrate, and a thermosetting binder with comparable faster reactivity may be applied on the thermosetting binder with low reactivity.

Controlling reactivity of said at least one thermosetting binder may comprise applying a first thermosetting binder in liquid form and applying a second thermosetting binder in dry form on the first thermosetting binder.

Controlling reactivity of said at least one thermosetting binder may comprise applying a urea formaldehyde resin, preferably in liquid form, and applying a melamine formaldehyde resin, preferably, in dry form, on the urea formaldehyde resin.

The layer comprising said at least one thermosetting binder may substantially consist of the thermosetting binder/binders. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbs the thermosetting binder. Preferably, the fillers may absorb at least less moisture, and thereby thermosetting binder, than wood fibres. The sub-layer may comprise inert fillers such as non-absorbing fillers.

An advantage of not including absorbing fillers, such as wood fibres, in the sub-layer is that less thermosetting binder is required to impregnate the sheet. There are no absorbing fillers in the sub-layer that the thermosetting binder has to impregnate in addition to the sheet, which is intended to be impregnated. Further, when including absorbing fillers in the sub-layer, a pre-pressing step may be required in order to adhere the sheet to the sub-layer.

The sub-layer may comprise the thermosetting binder and non-absorbing filler such as glass fibres, barium sulphate, calcium carbonate, talc, etc. The non-absorbing fillers have a function of reinforcing the layer and/or cover the colour of the substrate. The non-absorbing filler may be a non-porous filler. The filler may be an inorganic filler.

The method may further comprise printing, preferably by digital printing, a décor on the sheet when arranged on the sub-layer. The printing may be performed by a digital printing technique. The digital printing technique may be any non-contact printing method, such as using a Drop-on-Demand (DOD) technique. Examples of DOD techniques are piezoelectric DOD inkjet and thermal DOD inkjet. The ink used may be curable inks such as UV curable inks, solvent based inks, and aqueous inks (also called waterborne or water based inks). The sheet may alternatively be printed by a contact print technique.

Preferably, the sheet is adhered to the sub-layer prior to printing.

Alternatively, the décor may already be printed on the sheet when arranged on the sub-layer. The décor may be printed on the sheet by conventional printing techniques, such as rotogravure.

The substrate may be a wood-based board. The substrate may be a wood-fibre based board, a Wood Plastic Composite (WPC), a thermoplastic board, a mineral board, a plasterboard, a phenolic paper, or a HPL.

The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The thermosetting binder may be an amino resin.

The thermosetting binder may comprise melamine formaldehyde resin, urea formaldehyde resin, phenol formaldehyde resin, or a combination thereof.

The sheet may be adhered to the substrate by means of the sub-layer.

The sheet may be unimpregnated when applied on the sub-layer. An advantage is that the sheet, or at least an upper surface of the sheet facing away from the sub-layer, remains unimpregnated and substantially resin-free when arranged on the substrate. Thereby, it is possible to print on an unimpregnated surface of the sheet, while the sheet is arranged on the substrate. By printing on an unimpregnated surface of the sheet, for example, by means of digital printing, such as inkjet printing, the print is improved and an improved printing result is obtained. For example, bleeding is reduced.

In one embodiment, the sheet may be substantially unimpregnated. By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced.

In one embodiment, the sub-layer is in dry form when the sheet is applied.

According to a fifth aspect of the invention, a semi-finished product adapted to form, or form part of, a building panel is provided. The semi-finished product comprises a substrate, a sub-layer arranged on the substrate, wherein the sub-layer substantially consists of a thermosetting binder, a sheet arranged on the sub-layer, wherein the moisture content of the sub-layer is 5-35 wt %, preferably 15-25 wt %, such that the sheet is adhered to the sub-layer.

The sheet may be or comprise one or more of a paper sheet, a non-woven, a woven fibre sheet, or a fibre sheet.

The sub-layer may substantially consist of the thermosetting binder. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbs the thermosetting binder. Preferably, the fillers may absorb at least less moisture, and thereby thermosetting binder, than wood fibres. The sub-layer may comprise inert fillers such as non-absorbing fillers.

The sub-layer may comprise the thermosetting binder and non-absorbing fillers. The non-absorbing fillers may be glass fibres, barium sulphate, calcium carbonate, talc, etc. The non-absorbing fillers have a function of reinforcing the layer and/or cover the colour of the substrate. The non-absorbing filler may be a non-porous filler. The filler may be an inorganic filler.

In one embodiment, the thermosetting binder may be a B-stage thermosetting binder. The thermosetting binder may be in dry form.

In one embodiment, the thermosetting binder may be in A-stage and in B-stage.

By a B-stage thermosetting binder is meant a thermosetting binder close to the gel point, i.e. semi-cured. Thermosetting binders may be classified as A-, B-, and C-stage according to their extent of reaction compared to the extent of reaction at gelation. In an A-stage thermosetting binder, the extent of reaction is less than the extent of reaction at gelation, i.e. uncured. A B-stage thermosetting binder is close to the gel point, i.e. semi-cured. A C-stage thermosetting binder is well past the gel point, i.e. cured. The A-stage thermosetting binder is soluble and fusible. The B-stage thermosetting resin is still fusible but is barely soluble. The C-stage thermosetting binder is highly crosslinked and both infusible insoluble. (Principles of Polymerization, George Odian, 3rd edition).

An advantage of at least embodiments of the fifth aspect of the invention is that a semi-finished product suitable for digital printing is provided. A further advantage of printing on a sheet already adhered to the substrate by means of the sub-layer is that no positioning and difficult matching of the printed sheet to the substrate has to take place. Due to the adherence to the sub-layer, the sheet moves less during pressing. The sheet will swell less during printing, and less consideration to swelling of the sheet during printing has to be taken. Coordinating the print with an embossed structure of a press plate is therefore facilitated in order to obtain a décor with an embossed structure in register with the décor.

The sheet may be unimpregnated, or at least substantially unimpregnated. An advantage is that the sheet, or at least an upper surface of the sheet facing away from the sub-layer, remains unimpregnated and substantially resin-free when arranged on the substrate. Thereby, it is possible to print on an unimpregnated surface of the sheet, while the sheet is arranged on the substrate. By printing on an unimpregnated surface of the sheet, for example, by means of digital printing, such as inkjet printing, the print is improved and an improved printing result is obtained. For example, bleeding is reduced. By bleeding is meant that ink drops do not stay on the intended position but bleeds into adjacent print dots before drying and being absorbed into the sheet. Bleeding reduces the print quality.

By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced.

The sub-layer may have impregnated less than half the thickness of the sheet paper.

The substrate may be a wood-based board. The substrate may be a wood-fibre based board, a Wood Plastic Composite (WPC), a thermoplastic board, a mineral board, a plasterboard, a phenolic paper, or a HPL.

The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The thermosetting binder may be an amino resin.

The thermosetting binder may comprise melamine formaldehyde resin, urea formaldehyde resin, phenol formaldehyde resin, or a combination thereof.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
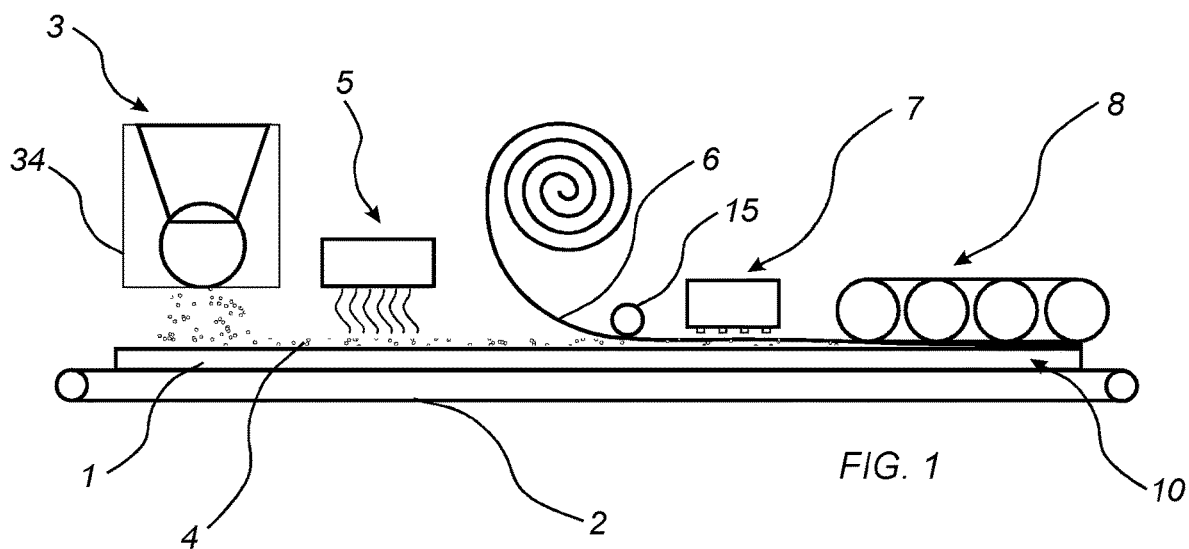
FIG. 1 shows an embodiment of a method to produce a building panel.

An embodiment of a method to produce a building panel 10 will now be described with reference to FIG. 1. In FIG. 1, a substrate 1 is provided. The substrate 1 may be a wood-based board. The substrate 1 may be a wood-fibre based board such as MDF, HDF, particleboard, OSB, etc. The substrate 1 may also be a WPC (Wood Plastic Composite) or other type of substrate comprising a thermoplastic material, optionally with fillers. The substrate may be a mineral board or a plasterboard. The substrate may be a phenolic paper or HPL.

The substrate 1 is conveyed, for example be a conveyor belt 2 or similar, under an application device 3. The application device 3 applies, preferably scatters, a dry powder material on an upper surface of the substrate 1 such that a sub-layer 4 is formed on the substrate 1. The dry powder material may substantially consist of a thermosetting binder.

The sub-layer 4 thereby formed may substantially consist of the thermosetting binder. The thermosetting binder may be in dry form, preferably dry powder form, when applied on the substrate 1. By substantially consisting of a thermosetting binder is meant that the sub-layer 4 comprises at least 90 wt % of the thermosetting binder, such as at least 95 wt % of the thermosetting binder. Preferably, the sub-layer 4 is filler-free, or preferably at least free from fillers absorbing moisture and thereby not absorbs the thermosetting binder, such as free from wood fibres. Preferably, the fillers may absorb at least less moisture, and thereby thermosetting binder, than wood fibres. The sub-layer 4 may comprise additives such as wetting agents, anti-stat agents, release agents, catalysts, etc. The sub-layer 4 may also comprise pigment. Further, the sub-layer 4 may comprise inert fillers, such as fillers not absorbing moisture, and thereby not absorbs the thermosetting binder. In one embodiment, the sub-layer 4 comprises the thermosetting binder and non-absorbing filler such as glass fibres, barium sulphate, calcium carbonate, talc, etc. The non-absorbing filler may be a non-porous filler. The filler may be an inorganic filler. Such non-absorbing fillers and/or pigments may cover the colour of the substrate and provide a desired colour of the sub-layer.

The thermosetting binder may be an amino resin. The thermosetting binder may be melamine formaldehyde resin, urea formaldehyde resin, phenol formaldehyde resin, or a combination thereof. The thermosetting binder may be spray-dried.

The thermosetting binder is applied in an amount of 50-200 g/m2.

The relative humidity (RH) of the ambient air enclosing the application device 3 may be controlled. The relative humidity of the ambient air enclosing the application device 3 may be 35-60% RH, preferably 40-55% RH. The application device 3 may be enclosed by a housing 34 such that the relative humidity (RH) of the ambient air can be controlled.

By controlling the relative humidity (RH) of the ambient air, it is possible to apply the thermosetting binder in dry form without the thermosetting binder getting sticky and adheres to the application device 3, or at least reducing the difficulties involved with applying, such as scattering, a powder material having a high concentration of thermosetting binder without any fillers absorbing the moisture. When applying a mix comprising both thermosetting binder and absorbing fillers, the fillers may absorb the moisture without the thermosetting binder getting too sticky. When applying a thermosetting binder without any absorbing fillers, problems associated therewith can be at least reduced by controlling the relative humidity (RH) of the ambient air enclosing the applying device 3.

In order to get the thermosetting binder of the sub-layer 4 sticky enough to obtain adherence to a sheet 6, moisture 5 may be applied. The moisture content may be controlled such that desired properties, such as reactivity, adherence, etc., are obtained.

It is desired that the moisture content of the sub-layer 4 when arranged on the substrate 1 is in the range of 5-35 wt %, preferably 15-25 wt %. The desired moisture content may be controlled by applying moisture 5 on the substrate prior to applying the sub-layer 4, on the sub-layer 4, and/or on the sheet 6. For example, moisture 5 may be applied and/or may be controlled by one or more of the following:

applying steam on the substrate 1 prior to applying the sub-layer 4, applying steam on the sub-layer 4 when arranged on the substrate 1, applying steam on the sheet 6 prior to being applied on the substrate 1, applying steam on the sheet 6 when being arranged on the substrate 1, applying liquid on the substrate 1 prior to applying the sub-layer 4, applying liquid on the sub-layer 4 when arranged on the substrate 1, applying liquid on the sheet 6 prior to being applied on the substrate 1, applying liquid on the sheet 6 when being arranged on the substrate 1, drying the sheet 4, and/or drying the sub-layer 4 when arranged on the substrate 1.

In the embodiment shown in FIG. 1, moisture 5 is applied on the sub-layer 4 when arranged on the substrate 1.

In the embodiment wherein moisture is applied to the sub-layer 4 by means of the sheet 6, the moisture content of the sub-layer 4 is to be measured when the sheet 6 is arranged on the sub-layer 4.

In one embodiment, moisture is applied by applying moist fillers on the sub-layer 4 and/or on the substrate 1.

When the sub-layer 4 is arranged on the substrate, the thermosetting binder of the sub-layer is substantially in B-stage.

The sub-layer 4 adheres to an upper surface of the substrate. A sheet 6 is applied on the sub-layer 4. The sheet may be a paper sheet, a non-woven, a woven fibre sheet such as textile, or a fibre sheet. The sheet may be fibre reinforced. The fibres may be cellulose fibres and/or cotton fibres. The sheet may include pigments and fillers.

The sheet 6 may be a conventional paper intended for laminate flooring, such as a paper intended to be used for rotogravure. The sheet may be an overlay paper. The sheet may be a paper adapted for ink jet printing.

The weight of the sheet 6 may for instance be 20-120 g/m2, preferably 45-80 g/m2, such as about 80 g/m2. The sheet 6 may be provided as separate sheets or as a continuous web. The weight of the sheet may depend on the amount of ink printed. If less ink is applied, the weight of the sheet can be reduced.

In one embodiment, the sheet 6 may be unimpregnated, or at least substantially unimpregnated. By unimpregnated is meant that the sheet 6 is substantially resin-free. By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced. The sheet may have passed an impregnation bath comprising an impregnating fluid comprising less than 20 wt % of a thermosetting binder, preferably comprising less than 10 wt % of a thermosetting binder. The side of the sheet adapted to face the substrate may have passed the impregnation bath. The sheet may thereafter be dried, preferably from the side of the sheet adapted to be printed, i.e. the side of the sheet adapted to be facing away from the substrate. In this embodiment, the sheet 6 may contain a small amount of thermosetting binder.

The sheet 6 may be steamed, or liquid may be applied, prior to being applied on the sub-layer 4, in order to swell the sheet and in order to avoid that wrinkles are formed in the sheet 6 when arranged on the sub-layer 4. In this manner, moisture 5 may be applied also on the sub-layer 4. The sheet 6 may also be stretched by a roller (not shown) prior to being applied to the sub-layer 4. In this embodiment, wherein moisture is applied to the sheet 6, the sub-layer may be applied in dry form, such as having a moisture content of less than 10% when being applied.

The sheet 6 is applied on the sub-layer 4 by a roller 15. The roller 15 may be a flexible roller. If the sub-layer and/or the substrate has an uneven surface, a flexible roller follows any variation in thickness such that variations in pressure are reduced. Variations in pressure may otherwise result in poor printing quality in portions being subjected to high pressure.

It is desired that the moisture content of the sub-layer 4 when the sheet is applied is in the range of 5-35 wt %, preferably 15-25 wt %.

By the moisture 5 applied, the thermosetting binder of the sub-layer 4 gets sticky such that the sheet 6 is adhered to the sub-layer 4. Thereby, the sheet 6 is adhered to the substrate 2 by means of the sub-layer 4. However, the upper side of the sheet 6 facing away from the sub-layer 4 remains unimpregnated by the thermosetting binder of the sub-layer 4 and substantially from the thermosetting binder of the sub-layer 4.

Figure 2:
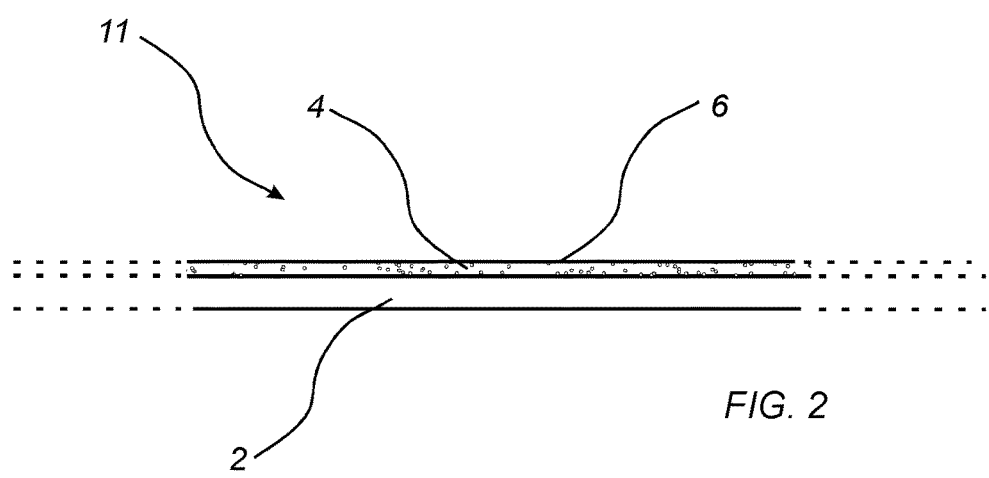
FIG. 2 shows an embodiment of a semi-finished product.

Thereby, a semi-finished product 11 is obtained, which is shown in more detail in FIG. 2. The semi-finished product 11 is a pre-preg for a building panel suitable for printing on the upper surface of the sheet 6. The thermosetting binder, forms the sub-layer 4 arranged on the substrate 1. In the semi-finished product 11, the thermosetting binder of the sub-layer 4 is substantially in B-stage. The moisture content is preferably in the range of 5-35 wt %, preferably 15-25 wt %. Due to the moisture, the thermosetting binder of the sub-layer 4 gets sticky such that the sub-layer 4 adheres to the substrate 1 and to the sheet 6. The semi-finished product 11 may therefore be handled and stored, for example, for a printing step performed later on.

When the sheet 6 is adhered to the sub-layer 4, the upper surface of the sheet 6, facing away from the sub-layer 4 may be printed. A décor may be printed on the upper surface of the sheet 6 by digital printing. The printer 7 may be an inkjet printer. The digital printing technique may be any non-contact printing method, such as using a Drop-on-Demand (DOD) technique. Examples of DOD techniques are piezo-electric DOD inkjet and thermal DOD inkjet. The ink used may be curable inks such as UV curable inks, solvent based inks, and aqueous inks (also called waterborne or water based inks).

If the sheet 6 is provided in form of a continuous web, the web may be cut into separate sheets prior to printing.

Prior to pressing, the printed décor may be dried by means of IR, NIR, hot air, etc. (not shown).

Prior to pressing, the printed décor may be dried by means of IR, NIR, hot air, etc. (not shown).

Prior to pressing, a protective layer (not shown) may be applied on the sheet 6 provided with the décor. The protective layer may be any kind of protective layer, such as a resin impregnated overlay paper with wear resistant particles, a powder overlay comprising a thermosetting binder applied in dry form with wear resistant particles, and/or a protective layer comprising a thermoplastic material.

The substrate 1, the sub-layer 4, the sheet 6, and any optional protective layer (not shown) are thereafter pressed together such that a building panel 10 is formed. The press 8 may be a static or continuous press. Preferably, both heat and pressure is applied. Pressing may take place during 8-35 seconds at 140-210° C. at about 40 bar. During pressing, the thermosetting binder of the sub-layer 4 impregnates the sheet 6 such that an impregnated décor sheet of the building panel 10 is formed. After pressing, the thermosetting binder/binders is substantially in its C-stage. During pressing, the sheet 6 provided with the décor may be embossed, preferably in register with the printed décor.

As an alternative or complement to applying a protective layer prior to pressing, a protective coating (not shown), such as a radiation curing coating, may be applied to the impregnated décor sheet after pressing.

The building panel 10 may be provided with mechanical locking system for joining with an adjacent building panel. The mechanical locking system may be of the type described in WO 2007/015669, WO 2008/004960, WO 2009/116926, or WO 2010/087752, the entire contents of each is expressly incorporated by reference herein.

The building panel 10 may be a floor panel, a ceiling panel, a wall panel, a door panel, a worktop, a furniture component, etc. The printed sheet 6 forms a décor layer of the building panel 10.

Figure 3:
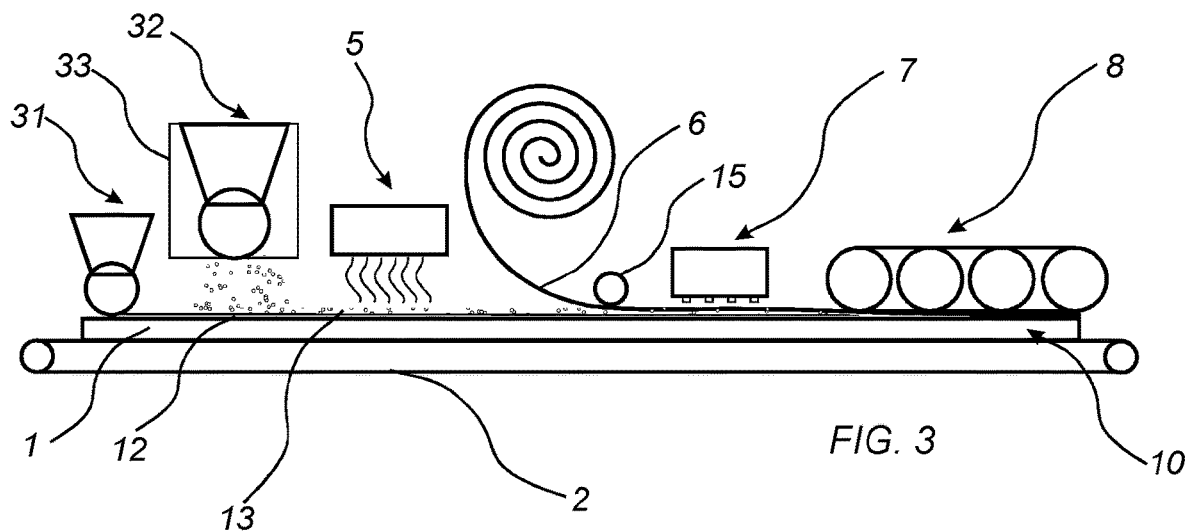
FIG. 3 shows an embodiment of a method to produce a building panel.

An embodiment of a method to produce a building panel 10 will now be described with reference to FIG. 3. In FIG. 3, a substrate 1 is provided. The substrate 1 may be a wood-based board. The substrate 1 may be a wood-fibre based board such as MDF, HDF, particleboard, OSB, etc. The substrate 1 may also be a WPC (Wood Plastic Composite) or other type of substrate comprising a thermoplastic material, optionally with fillers. The substrate may be a mineral board or a plasterboard.

The substrate 1 is conveyed, for example be a conveyor belt 2 or similar, under an application device. The application device 3 applies thermosetting binder/binders on an upper surface of the substrate 1. In the embodiment shown in FIG. 3, the application device 3 comprises a first application device 31 and a second application device 32.

The first application device 31 applies a first thermosetting binder in a first step such that a first layer 12 comprising the first thermosetting binder is formed. In a second step, the second application device 32 applies a second thermosetting binder on the first layer 12 such that a second layer is formed 13. The first layer and the second layer together form a sub-layer. Preferably, the first thermosetting binder has a higher reactivity compared to the second thermosetting binder. In one embodiment, the first thermosetting binder may be urea formaldehyde resin and the second thermosetting binder may be melamine formaldehyde resin. In one embodiment, the first and second thermosetting binders may be of the same type but may be applied in different forms, for example, a first thermosetting binder applied in liquid form and a second thermosetting binder applied in dry form. As a further example, the first thermosetting binder may be urea formaldehyde resin applied in liquid form, and the second thermosetting binder may be melamine formaldehyde resin applied in dry form. As an example, the first thermosetting binder may have moisture content exceeding 55 wt % and the second thermosetting binder may have moisture content of less than 30 wt %.

The first and/or the second thermosetting binder may be an amino resin. The first and/or the second thermosetting binder may be melamine formaldehyde resin, urea formaldehyde resin, phenol formaldehyde resin, or a combination thereof. Additives such as wetting agents, anti-stat agents, release agents, catalysts, etc., may be added the first and/or the second thermosetting binder.

Thereby, by combining different thermosetting binders and/or different forms of thermosetting binders, such as liquid and dry, reactivity may be controlled. By applying the first layer 12 of a thermosetting binder having high reactivity on the substrate 1, during pressing, the thermosetting binder with high reactivity prevents flowing of any other thermosetting binder with lower reactivity into the substrate since the thermosetting binder with high reactivity cures faster than the other thermosetting binder with lower reactivity applied thereon. Thereby, the other thermosetting binder with lower reactivity will instead flow into the sheet and impregnate the sheet.

The first and the second layers 12, 13 formed may substantially consist of the first thermosetting binder and the second thermosetting binder, respectively. By substantially consisting is meant that the first and/or second layers comprises at least 90 wt % of the thermosetting binder, such as at least 95 wt % of the thermosetting binder. Preferably, the first and the second layers 12, 13 are filler-free, or preferably at least free from fillers absorbing moisture and thereby not absorbs the thermosetting binder, such as free from wood fibres. Preferably, the fillers may absorb at least less moisture, and thereby thermosetting binder, than wood fibres.

The first and the second layers 12, 13 may comprise additives such as wetting agents, anti-stat agents, release agents, catalysts, etc. The first and the second layers 12, 13 may also comprise pigment. Further, the first and the second layers 12, 13 may comprise inert fillers, such as fillers not absorbing moisture and thereby not absorbs the thermosetting binder. In one embodiment, the first and second layers 12, 13 comprise the thermosetting binder and non-absorbing filler such as glass fibres, barium sulphate, calcium carbonate, talc, etc. The non-absorbing filler may be a non-porous filler. The filler may be an inorganic filler. Such non-absorbing filers and/or pigments may cover the colour of the substrate and provide a desired colour of the first and second layers 12, 13.

As described above, the relative humidity (RH) of the ambient air enclosing the application device 3 may be controlled. Especially, the ambient air enclosing the second application device 32 applying the second thermosetting binder may be controlled, especially if the second thermosetting binder is applied in powder form.

The relative humidity of the ambient air enclosing the application device, or at least the second application device 32 applying a thermosetting binder in powder form, may be 35-60% RH, preferably 40-55% RH. The second application device 32 may be enclosed by a housing 33 such that the relative humidity (RH) of the ambient air can be controlled.

By controlling the relative humidity (RH) of the ambient air, it is possible to apply the thermosetting binder in powder form without the thermosetting binder getting sticky and adhere to the second application device 32, or at least reducing the difficulties involved with applying, such as scattering, a powder material having a high concentration of thermosetting binder without any fillers absorbing the moisture.

In order to get the thermosetting binder of the second layer 13 sticky enough to obtain adherence to a sheet 6, moisture 5 may be applied. The moisture content may be controlled such that desired properties, such as reactivity, adherence, etc., are obtained.

It is desired that the moisture content of the second layer 13 is in the range of 5-35 wt %, preferably 15-25 wt %. The desired moisture content may be controlled by applying moisture 5 on the substrate 1, on the first layer 12 of the first thermosetting binder, on the second layer 13 of the second thermosetting binder, and/or on the sheet 6. Sufficient amount of moisture 5 may also be achieved by applying the first thermosetting binder in liquid form. For example, moisture 5 may be applied and/or may be controlled by one or more of the following:

applying steam on the substrate 1 prior to applying the first layer 12 of the first thermosetting material, applying steam on the second layer 13 of the second thermosetting binder, applying steam on the sheet 6 prior to being applied on the substrate 1, applying steam on the sheet 6 when being arranged on the substrate 1, applying liquid on the substrate 1 prior to applying the first layer 12 of the first thermosetting material, applying liquid on the second layer 13 of the second thermosetting binder applying liquid on the sheet 6 prior to being applied on the substrate 1, applying liquid on the sheet 6 when being arranged on the substrate 1, and/or drying the any of the first and/or second layers 12, 13 when arranged on the substrate.

In the embodiment shown in FIG. 3, moisture 5 is applied on the second layer 13.

When arranged on the substrate 1, the first thermosetting binder may be substantially in A-stage and the second thermosetting binder may be substantially in B-stage.

The sub-layer 14 formed by the first and second layers 12, 13 adheres to the substrate 1.

A sheet 6 is applied on the second layer 13. The sheet 6 may be a paper sheet, a non-woven, woven fibre sheet such as textile, or a fibre sheet. The sheet may be fibre reinforced. The fibres may be cellulose fibres and/or cotton fibres. The sheet may include pigments and fillers.

The sheet 6 may be a conventional paper intended for laminate flooring, such as a paper intended for rotogravure. The sheet may be an overlay paper. The sheet may be a paper adapted for ink jet printing.

The weight of the sheet 6 may for instance be 20-120 g/m2, preferably 45-80 g/m2, such as about 80 g/m2. The sheet 6 may be provided as separate sheets or as a continuous web. The weight of the sheet may depend on the amount of ink printed. If less ink is applied, the weight of the sheet can be reduced.

In one embodiment, the sheet 6 may be unimpregnated, or at least substantially unimpregnated. By unimpregnated is meant that the sheet 6 is substantially resin-free. By substantially unimpregnated is meant that the sheet may have been impregnated by a fluid comprising less than 20 wt % of a thermosetting binder, preferably comprising less than 10 wt % of a thermosetting binder. By substantially unimpregnated is meant that the surface of the sheet is still permeable. By the sheet still being permeable, the sheet may still absorb ink during printing, such that bleeding of the print is reduced. The sheet may have passed an impregnation bath comprising an impregnating fluid comprising less than 20 wt % of a thermosetting binder, preferably comprising less than 10 wt % of a thermosetting binder. The side of the sheet adapted to face the substrate may have passed the impregnation bath. The sheet may thereafter be dried, preferably from the side of the sheet adapted to be printed, i.e. the side of the sheet adapted to be facing away from the substrate. In this embodiment, the sheet 6 may contain a small amount of thermosetting binder.

The sheet 6 may be steamed, or liquid may be applied, prior to being applied on the sub-layer 14, in order to swell the sheet and in order to avoid that wrinkles are formed in the sheet 6 when arranged on the sub-layer 14. In this manner, moisture 5 may be applied also on the sub-layer 14. The sheet 6 may also be stretched by a roller (not shown) prior to being applied to the sub-layer 14.

The sheet 6 is applied on the sub-layer 14 by a roller 15. The roller 15 may be a flexible roller. If the sub-layer 14 and/or the substrate 1 have an uneven surface, a flexible roller follows any variation in thickness such that variations in pressure are reduced. Variations in pressure may otherwise result in poor printing quality in portions being subjected to high pressure.

When applying the sheet 6, it is desired that the second layer 13 has a moisture content the range of 5-35 wt %, preferably 15-25 wt %.

By the moisture 5 applied, the thermosetting binder of the second layer 13 gets sticky such that the sheet 6 is adhered to the second layer 13. Thereby, the sheet 6 adheres to the substrate 1 by means of the first and the second layers 12, 13. However, the upper side of the sheet 13 facing away from the sub-layer remains unimpregnated by the thermosetting binder of the second layer 13 and substantially free from the thermosetting binders of the second layer 13.

Figure 4:
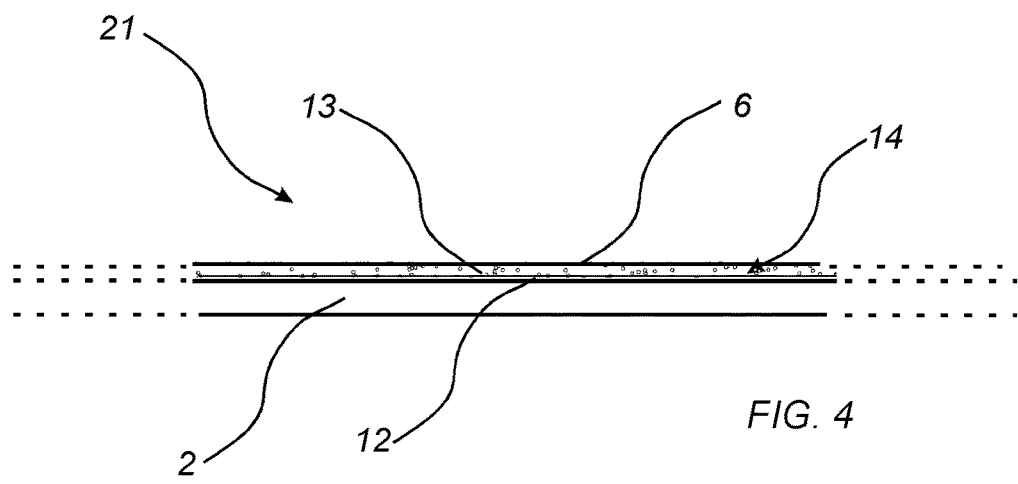
FIG. 4 shows an embodiment of a semi-finished product.

Thereby, a semi-finished 21 product is obtained, which is shown in more detail in FIG. 4. The semi-finished product 21 is a pre-preg for a building panel suitable for printing on the upper surface of the sheet 6. The first and the second layers 12, 13 form the sub-layer 14, which may substantially consist of thermosetting binders. By substantially consisting of a thermosetting binder is meant that the sub-layer comprises at least 90 wt % of the thermosetting binder, such as at least 95 wt % of the thermosetting binder. Preferably, the sub-layer is filler-free, or preferably at least free from fillers absorbing moisture, and thereby not absorbing the thermosetting binder. Preferably, the fillers may absorb at least less moisture, and thereby thermosetting binder, than wood fibres. The sub-layer may comprise inert fillers such as non-absorbing fillers. In one embodiment, the sub-layer 4 comprises the thermosetting binder and non-absorbing filler such as glass fibres, barium sulphate, calcium carbonate, talc, etc. The non-absorbing filler may be meant a non-porous filler. The filler may be an inorganic filler. Such non-absorbing filers and/or pigments may cover the colour of the substrate and provide a desired colour of the sub-layer.

In the semi-finished product 21, the thermosetting binder/binders is substantially in A-stage and in B-stage. The first thermosetting binder may be in A-stage. The second thermosetting binder may be in B-stage. The moisture content of the second layer 13 is preferably in the range of 5-35 wt %, preferably 15-25 wt %. Due to the moisture, the thermosetting binder of the second layer 13 gets sticky such that the first and second layers 12, 13 adheres to the substrate 1 and to the sheet 6. The semi-finished product may therefore be handled and stored, for example, for a printing step performed later on.

When the sheet 6 is adhered to the second layer 13, the upper surface of the sheet 6, facing away from the second layer 13, may be printed. A décor may be printed on the upper surface of the sheet 6 by digital printing. The printer 7 may be an inkjet printer. The digital printing technique may be any non-contact printing method, such as using a Drop-on-Demand (DOD) technique. Examples of DOD techniques are piezoelectric DOD inkjet and thermal DOD inkjet. The ink used may be curable inks such as UV curable inks, solvent based inks, and aqueous inks (also called waterborne or water based inks).

If the sheet 6 is provided in form of a continuous web, the web may be cut into separate sheets prior to printing.

Prior to printing, the printed décor may be dried by means of IR, NIR, hot air, etc. (not shown).

Prior to pressing, the printed décor may be dried by means of IR, NIR, hot air, etc. (not shown).

Prior to pressing, a protective layer (not shown) may be applied on the sheet 6 provided with the décor. The protective layer may be any kind of protective layer, such as a resin impregnated overlay paper with wear resistant particles, a powder overlay comprising a thermosetting binder applied in dry form with wear resistant particles, and/or a protective layer comprising a thermoplastic material.

The substrate 1, the sub-layer 14 formed by the first and the second layers 12, 13, the sheet 6, and any optional protective layer (not shown) are thereafter pressed together such that a building panel 10 is formed. The press 8 may be a static or continuous press. Preferably, both heat and pressure is applied. Pressing may take place during 8-35 seconds at 140-210° C. at about 40 bar. During pressing, the thermosetting binder of at least the second layer 13 impregnates the sheet 6 such that an impregnated décor sheet of the building panel 10 is formed. The first layer 12 of the first thermosetting binder having higher reactivity compared the second thermosetting binder prevents, or at least reduce, flowing of the second thermosetting binder into the substrate 1, since the first thermosetting binder cures faster than the second thermosetting binder. Thereby, the flowing of the second thermosetting binder can be controlled to flow into the sheet to impregnate the sheet. During pressing, the sheet 6 provided with the décor may be embossed, preferably in register with the printed décor. After pressing, the thermosetting binder/binders is substantially in its C-stage.

As an alternative or complement to applying a protective layer prior to pressing, a protective coating (not shown), such as a radiation curing coating, may be applied to the impregnated décor sheet after pressing.

The building panel 10 may be provided with mechanical locking system for joining with an adjacent building panel. The mechanical locking system may be of the type described in WO 2007/015669, WO 2008/004960, WO 2009/116926, or WO 2010/087752, the entire contents of each is expressly incorporated by reference herein.

The building panel 10 may be a floor panel, a ceiling panel, a wall panel, a door panel, a worktop, a furniture component, etc. The printed sheet forms a décor layer of the building panel 10.

It is also contemplated the décor may already be printed on the sheet 6 when arranged on the sub-layer 4 or on the second layer 13 of the above described type. The décor may be printed on the sheet 6 by conventional printing techniques, such as rotogravure. In this embodiment, the sub-layer 4 or the second layer 13 adheres the sheet 6 to the substrate 1. During pressing, the printed sheet 6 is impregnated by means of the thermosetting binder of the underlying sub-layer 4 or of the underlying second layer 13.

It is contemplated that there are numerous modifications of the embodiments described herein, which are still within the scope of the invention as defined by the appended claims. For example, it is contemplated that more than one wear resistant foil may be arranged on a core for forming a building panel.

It is also contemplated that in embodiments, for example when the substrate is a phenolic paper or HPL, the substrate, the sub-layer and the sheet may be attached to a board, for example, by an adhesive, in a separate process after pressing.

EXAMPLE 150 g/m2 of a spray dried melamine formaldehyde resin powder was applied on a HDF board. 20 g/m2 of water was sprayed on the melamine formaldehyde resin layer. Steam is applied on an unimpregnated paper adapted for inkjet printer. The unimpregnated paper is applied on the melamine formaldehyde resin layer by a roller. A décor is printed on the unimpregnated paper by an inkjet printer with aqueous inks when the paper is arranged on the melamine formaldehyde resin layer. An overlay paper is arranged on the unimpregnated paper after printing. The assembly is pressed during 15 seconds at 175° C. and 40 bar.

The invention claimed is:
1. A method to produce a building panel, comprising
providing a substrate,
applying a thermosetting binder in dry form on the substrate for forming a sub-layer,
controlling the moisture content of the sub-layer when arranged on the substrate,
applying a sheet on the sub-layer, while the sub-layer is sticky from applied moisture, wherein the sheet comprises one or more of a paper sheet, a non-woven, a woven fibre sheet, or a fibre sheet, and wherein the sheet further comprises pigments and/or fillers, and pressing the substrate, the sub-layer and the sheet together to form a building panel, thereby the thermosetting binder of the sub-layer impregnates the sheet, wherein controlling the moisture content of the sub-layer comprises:

controlling adhesion of the sheet to sub-layer by applying moisture to the sub layer; and controlling flow of the thermosetting binder of the sub-layer.

2. The method according to claim 1, wherein controlling the moisture content of the sub-layer comprises one or more of the following:

applying steam on the substrate prior to applying the sub-layer, applying steam on the sub-layer when arranged on the substrate, applying steam on the sheet, applying liquid on the substrate prior to applying the sub-layer, applying liquid on the sub-layer when arranged on the substrate, applying liquid on the sheet, and/or drying the sub-layer and/or the sheet.

3. The method according to claim 1, wherein the moisture content of the sub-layer when arranged on the substrate is 5-35 wt %.

4. The method according to claim 1, wherein the sheet being applied on the sub-layer is unimpregnated or impregnated by a fluid comprising less than 20 wt % of a thermosetting binder.

5. The method according to claim 1, wherein the sub-layer consists essentially of the thermosetting binder.

6. The method according to claim 1, further comprising printing a décor on the sheet when arranged on the sub-layer.

7. The method according to claim 6, wherein the sheet is adhered to the sub-layer prior to printing.

8. A method to produce a building panel, comprising providing a substrate, controlling relative humidity (RH) of ambient air enclosing an application device adapted to apply a thermosetting binder in dry form, applying a thermosetting binder in dry form on the substrate by said application device for forming a sub-layer, applying a sheet on the sub-layer, wherein the sheet comprises pigments and/or fillers, and pressing the substrate, the sub-layer and the sheet together to form a building panel, thereby the thermosetting binder of the sub-layer impregnates the sheet, wherein the relative humidity (RH) is 35-60% RH.

9. The method according to claim 8, wherein the sheet being applied on the sub-layer is unimpregnated or impregnated by a fluid comprising less than 20 wt % of a thermosetting binder.

10. The method according to claim 8, wherein the sheet comprises one or more of a paper sheet, a non-woven, a woven fibre sheet, or a fibre sheet.

11. The method according to claim 8, wherein the sub-layer consists essentially of the thermosetting binder.

12. The method according to claim 8, further comprising printing a décor on the sheet when arranged on the sub-layer.

13. The method according to claim 12, wherein the sheet is adhered to the sub-layer prior to printing.

14. The method according to claim 8, further comprising applying moisture to the thermosetting binder, the sub-layer, the sheet, and/or the substrate prior to pressing.

15. The method according to claim 8, wherein a moisture content of the sub-layer when arranged on the substrate is 5-35 wt %.

16. A method to produce a building panel, comprising providing a substrate, applying a thermosetting binder in dry form on the substrate for forming a sub-layer, controlling the moisture content of the sub-layer when arranged on the substrate, applying a sheet on the sub-layer, while the sub-layer is sticky from applied moisture, wherein the sheet comprises one or more of a paper sheet, a non-woven, a woven fibre sheet, or a fibre sheet, and wherein the sheet further comprises pigments and/or fillers, pressing the substrate, the sub-layer and the sheet together to form a building panel, thereby the thermosetting binder of the sub-layer impregnates the sheet, wherein the sub-layer comprises the thermosetting binder and non-absorbing fillers, wherein the sheet comprises a print, wherein controlling the moisture content of the sub-layer comprises:

controlling adhesion of the sheet to sub-layer by applying moisture to the sub- layer; and controlling flow of the thermosetting binder of the sub-layer.

17. The method according to claim 16, wherein the sheet being applied on the sub-layer is unimpregnated or impregnated by a fluid comprising less than 20 wt % of a thermosetting binder.

18. The method according to claim 16, wherein the sub-layer consists essentially of the thermosetting binder.

19. The method according to claim 16, further comprising applying moisture to the thermosetting binder, the sub-layer, the sheet, and/or the substrate prior to pressing.

20. The method according to claim 16, wherein a moisture content of the sub-layer when arranged on the substrate is 5-35 wt %.

21. The method according to claim 16, further comprising printing the print on the sheet when arranged on the sub-layer, wherein the print is a décor.

22. The method according to claim 16, wherein the sheet is adhered to the sub-layer prior to printing.

23. The method according to claim 16, wherein a moisture content of the sub-layer when arranged on the substrate is 15-35 wt. %.

* * * * *